United States Patent
Birkenstock (10) Patent No.: US 9,221,401 B1
(45) Date of Patent: *Dec. 29, 2015

(54) TELESCOPIC BRACKET ASSEMBLY FOR VEHICLE WASTE TANKS

(71) Applicant: Brian Birkenstock, Rockledge, FL (US)

(72) Inventor: Brian Birkenstock, Rockledge, FL (US)

( * ) Notice: Subject to any disclaimer, the term of this patent is extended or adjusted under 35 U.S.C. 154(b) by 84 days.

This patent is subject to a terminal disclaimer.

(21) Appl. No.: 14/169,319

(22) Filed: Jan. 31, 2014

(51) Int. Cl.
*B60R 15/04* (2006.01)
*B60R 9/00* (2006.01)

(52) U.S. Cl.
CPC .. *B60R 9/00* (2013.01); *B60R 15/04* (2013.01)

(58) Field of Classification Search
CPC ........... B60R 15/04; B60R 9/00; B62D 43/04
USPC .................................. 224/496, 548; 414/462
See application file for complete search history.

(56) References Cited

U.S. PATENT DOCUMENTS

| | | | |
|---|---|---|---|
| 1,913,835 A | 6/1933 | Golike | |
| 3,554,415 A * | 1/1971 | Woods | 224/491 |
| 3,570,016 A | 3/1971 | Ellis et al. | |
| 3,981,323 A * | 9/1976 | Watson | 137/899 |
| 4,072,258 A | 2/1978 | Cruson | |
| 4,776,631 A | 10/1988 | Sargent et al. | |
| 4,974,899 A | 12/1990 | Sargent | |
| 5,022,573 A * | 6/1991 | Barkouskie | 224/42.21 |
| 5,056,166 A | 10/1991 | Sargent et al. | |
| 5,197,641 A * | 3/1993 | Montgomery, Jr. | 224/42.21 |
| 5,238,358 A * | 8/1993 | Higgins et al. | 414/463 |
| 5,284,349 A | 2/1994 | Bruns et al. | |
| 5,346,245 A | 9/1994 | Budrow et al. | |
| 5,860,786 A * | 1/1999 | Aubrecht | 414/463 |
| 6,129,117 A | 10/2000 | Eriksson | |
| 6,189,161 B1 | 2/2001 | Rijn et al. | |
| 6,345,749 B1 | 2/2002 | Hamilton | |
| 7,066,528 B1 | 6/2006 | Crean | |
| 7,293,298 B2 | 11/2007 | Cameron et al. | |
| 7,621,565 B2 | 11/2009 | Ross, Jr. et al. | |
| 8,449,239 B1 | 5/2013 | Birkenstock | |
| 2007/0297886 A1 * | 12/2007 | Bruce et al. | 414/462 |
| 2008/0035654 A1 * | 2/2008 | Hall et al. | 220/745 |

* cited by examiner

*Primary Examiner* — Adam Waggenspack
(74) *Attorney, Agent, or Firm* — Albert Bordas, P.A.

(57) ABSTRACT

A telescopic bracket assembly for vehicle waste tanks, having at least first and second longitudinal frame members, at least one transversal member, a wheel chock assembly, at least one aft transversal member, and at least one longitudinal telescopic assembly. The wheel chock assembly has at least first and second wheel chocks that are fixed to the at least first and second longitudinal frame members respectively. The telescopic bracket assembly for vehicle waste tanks also has at least one transversal telescopic assembly. In a preferred embodiment, the telescopic bracket assembly for vehicle waste tanks is mounted onto an underside of a vehicle, so that it does not obstruct any functionalities of the vehicle. As an example, the vehicle may be a recreational vehicle, or a food trailer, better known as food truck.

13 Claims, 5 Drawing Sheets

TELESCOPIC BRACKET ASSEMBLY FOR VEHICLE WASTE TANKS

BACKGROUND OF THE INVENTION

1. Field of the Invention

The present invention relates to recreational vehicle accessories, and more particularly, to bracket assemblies for vehicle waste tanks commonly used with recreational vehicles and food trailers, better known as food trucks.

2. Description of the Related Art

Applicant believes that one of the closest references corresponds to Applicant's own U.S. Pat. No. 8,449,239 B1 issued on May 28, 2013 for Bracket Assembly for Vehicle Waste Tanks. However, it differs from the present invention because Birkenstock's U.S. Pat. No. 8,449,239 B1 teaches a bracket assembly for vehicle waste tanks having first and second longitudinal frame members. The longitudinal frame members each have proximal ends and lateral edges. In addition, the longitudinal frame members each have sidewalls extending therefrom. The sidewalls extend from their respective proximal ends a predetermined distance. Each proximal end has hinge assemblies that mount onto a vehicle. In a preferred embodiment, the bracket assembly for vehicle waste tanks is mounted onto an underside of the vehicle, so that it is not seen and does not obstruct any functionalities of the vehicle, which may be a recreational vehicle having a kitchen, a bathroom, a bedroom and a living room. The vehicle may also be defined as a caravan, camper, or camper van. The vehicle is intended for everything from brief leisure activities such as vacations and camping, to full-time living, for which they are often parked in special trailer parks.

Applicant believes that another reference corresponds to U.S. Pat. No. 5,860,786 B1 issued to Aubrecht on Jan. 19, 1999 for Spare Tire Holder Having a Slidable Support Shelf. However, it differs from the present invention because Aubrecht teaches a spare tire holder which lowers at least the rearward end of a slidable support shelf via first and second rear telescopic vertical support members wherein the slidable support shelf includes a handle which when pulled slides the slidable support shelf from under the vehicle through two parallel spaced channel rail guides.

Applicant believes that another reference corresponds to U.S. Pat. No. 4,072,258 B1 issued to Cruson on Feb. 7, 1978 for Retractable Unitary Compact Spare Tire Carrier Assembly for Underbody Mounting to a Pickup Truck or the Like. However, it differs from the present invention because Cruson teaches an inverted U-shaped mounting bracket that is bolted to the bottom of one pickup truck U-frame member at the rear of the truck and an inverted L-shaped mounting bracket is bolted to the bottom of the other truck U-frame member in laterally opposed position, pairs of forward and rear hanger arms are each pivoted at one end to said respective brackets and at their lower ends to the sides of a spare tire carrier rack to form a parallelogram arrangement for supporting a spare tire horizontally beneath the rear of the truck. A compact screw drive mechanism has its forward end respectively mounted to an extended outer wall of said inverted U-shaped mounting bracket and its rear end mounted to the same wall in the area of the pivot connections for the hanger arms to the U-shaped mounting bracket, and carries a screw rotatable about its axis and extending longitudinally along the U-shaped bracket which, in turn, carries a nut restrained from rotation but movable along the screw axis during screw rotation. A drive lever is pivoted at one end to the nut and at the other end to the adjacent rear hanger arm to cause the rack and the spare tire carried between the pairs of hanger arms and upon the rack to swing forwardly and upwardly in close proximity to the underbody of the truck, and vice versa.

Applicant believes that another reference corresponds to U.S. Pat. No. 1,913,835 B1 issued to Golike on Jun. 13, 1933 for Tire Carrier. However, it differs from the present invention because Golike teaches an undercarriage support bracket having longitudinal frame members, hinge assemblies mounting the proximal ends to a vehicle, and at least one aft transversal member comprising at least one through hole.

Applicant believes that another reference corresponds to U.S. Pat. No. 6,189,161 B1 issued to Rijn, et al. on Feb. 20, 2001 for toilet for recreational vehicle with vent for the holding tank. However, it differs from the present invention because Rijn, et al. teaches a valve and vent assembly for a self-contained sanitary system of the type including a toilet structure with a downwardly directed outlet opening and a storage compartment defined and located below the outlet opening, and a waste holding tank removably disposed within the storage compartment. The tank has a fill opening positioned in registry with the outlet opening when the tank is inserted within the storage compartment. The valve and vent assembly is operable to close the fill opening and to seal the tank to prevent leakage of waste from the tank through the fill opening, a vent passage in the storage compartment and communicating with the waste holding tank extends outside of said compartment thereby enabling noxious and odorous air in the holding tank to pass out of the tank.

Applicant believes that another reference corresponds to U.S. Pat. No. 7,293,298 B1 issued to Cameron, et al. on Nov. 13, 2007 for a self-contained sanitary system for a vehicle. However, it differs from the present invention because Cameron, et al. teaches a self-contained sanitary system for a vehicle that includes a toilet with a flush tank for storing a source of flush water. The system further includes a spout in fluid communication with the flush tank. The spout has a first open end coupled to the flush tank and a second open end. The spout is coupled for rotation about a generally vertical axis between a stowed position and an access position. The second end is rotatable relative to the first end about a generally horizontal axis between a fill position and a drainage position. The system further includes a bench and a holding tank. The holding tank is removably associated with the toilet and includes a pair of wheels and a retractable handle.

Applicant believes that another reference corresponds to U.S. Pat. No. 7,621,565 B2 issued to Ross, Jr. et al. on Nov. 24, 2009 for a container mounting assembly. However, it differs from the present invention because Ross, Jr. et al. teaches a mounting assembly for holding and moving a propane cylinder between a first operational position and a second lower loading/unloading position with respect to a support structure of a forklift. The mounting assembly includes a base member adapted for connection to the forklift support structure, a cradle for supporting the cylinder between the first and second positions, and first and second pivot arms having a first end pivotally connected to the base member and a second end pivotally connected to the cradle. In the first position, the cradle is in a generally horizontal orientation. In the second position, the cradle is in a generally vertical orientation. Angular movement of the first and second pivot arms causes rotation of the cradle between the generally horizontal and generally vertical orientations.

Applicant believes that another reference corresponds to U.S. Pat. No. 7,066,528 B1 issued to Crean on Jun. 27, 2006 for a slide-out lifting and lowering mechanism. However, it differs from the present invention because Crean teaches a recreational vehicle having a slide-out housing, wherein the slide-out housing may be positioned in either a retracted or deployed configuration. In the deployed configuration, the slide-out housing extends outwardly from a main housing of the recreational vehicle so as to enlarge the living space within the main housing. In the retracted configuration, the slide-out housing extends inwardly into the main housing so as to reduce the living space within the main housing. In various embodiments, the slide-out housing is lifted prior to retraction and lowered after deployment so that the floor of the slide-out housing aligns with the floor of the main housing. In other various embodiments, vertical movement of the slide-out housing may occur during retraction and deployment. Moreover, the recreational vehicle may utilize a vertical actuating assembly that is adapted to engage with the slide-out housing to thereby lift and lower the slide-out housing.

Applicant believes that another reference corresponds to U.S. Pat. No. 6,345,749 B1 issued to Hamilton on Feb. 12, 2002 for a recreational vehicle tank hauling assembly. However, it differs from the present invention because Hamilton teaches a recreational vehicle tank hauling assembly for transporting waste tanks by automotive vehicle without requiring the waste tank to be lifted from the ground. The recreational vehicle tank hauling assembly includes a connection member adapted for coupling to a trailer hitch, an axle extending from the connection member, a deck assembly rotatably coupled to the axle, and a pin for securing the rotation of the deck with respect to the axle.

Applicant believes that another reference corresponds to U.S. Pat. No. 6,129,117 B1 issued to Eriksson on Oct. 10, 2000 for a portable holding tank. However, it differs from the present invention because Eriksson teaches a portable tank for handling recreational vehicle liquid waste comprising a molded receptacle of synthetic plastic material having wheels, including a caster wheel. The receptacle is provided with an inlet port for receiving liquid waste, and an outlet port defined in a side of the receptacle is opened and closed by a gate valve permitting the receptacle to be easily emptied.

Applicant believes that another reference corresponds to U.S. Pat. No. 5,346,245 B1 issued to Budrow, et al. on Sep. 13, 1994 for a portable tank with extending handle. However, it differs from the present invention because Budrow, et al. teaches a portable tank particularly suitable for handling recreational vehicle liquid waste of relatively large capacity, i.e. 30 gallons, including a receptacle formed of a synthetic plastic material having wheels mounted upon one end of the receptacle and a handle support molded into the lower region of the receptacle telescopingly receiving an extendable and retractable handle. The outer end of the handle telescopingly receives a handle extension having a grip mounted thereon for manually handling the tank, or attachment to a vehicle trailer hitch.

Applicant believes that another reference corresponds to U.S. Pat. No. 5,284,349 B1 issued to Bruns, et al. on Feb. 8, 1994 for a cab step assembly. However, it differs from the present invention because Bruns, et al. teaches a crop sprayer cab that has a step assembly facilitating ingress and egress of the operator into and out of the cab. The step assembly has floor and step sections operable for movement between an up, closed position and a down, step position relative to the floor of the cab. Links connected to the cab floor and the floor section limit downward movement of the step section and allow the step assembly to be moved to a closed position. A hand operated lever is operable to pivot the step assembly to the up, closed position.

Applicant believes that another reference corresponds to U.S. Pat. No. 5,056,166 B1 issued to Sargent, et al. on Oct. 15, 1991 for self-contained RV sanitary systems. However, it differs from the present invention because Sargent, et al. teaches a self-contained sanitary fixture, particularly for a recreational vehicle, comprising a bench supported on a base cooperatively defining a stowage compartment. The bench contains a bowl having an outlet, which connects, to a tank in the storage compartment. A valve on the tank controls passage between the bowl and the tank. The valve is itself operated from a knob on the bench through a coupling mechanism. Waste water from the bowl is collected in the tank and is disposed of by sliding the tank out of the stowage compartment through an opening in the RV's sidewall and carrying the tank to a suitable disposal site. The tank incorporates a rotatable pourspout and vent valve to facilitate pouring waste contents out of the tank. The connections between the bowl outlet and the tank and between the knob and valve automatically disconnect upon removal of the tank from the stowage compartment. Similarly, they automatically reconnect when the tank is inserted back into the stowage compartment.

Applicant believes that another reference corresponds to U.S. Pat. No. 4,974,899 B1 issued to Sargent on Dec. 4, 1990 for a recreational vehicle use system particularly tank installation. However, it differs from the present invention because Sargent teaches the body of a recreational vehicle (RV) that is configured to have a stowage compartment within the body's interior but separate from the interior occupant space. The stowage compartment contains a tank, which serves water use fixtures in the interior occupant space. The stowage compartment is disposed adjacent the sidewall of the RV body and an opening is provided through the sidewall from the stowage space to the exterior. This opening is closed by a door. When the door is open, the tank can pass through the opening into and out of the stowage space. The tank can be either a fresh water tank containing a supply of fresh water for use at sanitary fixtures in the RV or alternatively it can be a waste water tank of either the gray water or black water type which collects waste from the water use fixtures.

Applicant believes that another reference corresponds to U.S. Pat. No. 4,776,631 B1 issued to Sargent, et al. on Oct. 18, 1988 for self-contained RV sanitary systems. However, it differs from the present invention because Sargent, et al. teaches a self-contained sanitary fixture, particularly for a recreational vehicle, comprising a bench supported on a base cooperatively defining a stowage compartment. The bench contains a bowl having an outlet, which connects to a tank in the stowage compartment. A valve on the tank controls passage between the bowl and the tank. The valve is itself operated from a knob on the bench through a coupling mechanism. Waste water from the bowl is collected in the tank and is disposed of by sliding the tank out of the stowage compartment through an opening in the RV's sidewall and carrying the tank to a suitable disposal site. The tank incorporates a rotatable pourspout and vent valve to facilitate pouring waste contents out of the tank. The connections between the bowl outlet and the tank and between the knob and valve automatically disconnect upon removal of the tank from the stowage compartment. Similarly, they automatically reconnect when the tank is inserted back into the stowage compartment.

Applicant believes that another reference corresponds to U.S. Pat. No. 3,981,323 B1 issued to Watson on Sep. 21, 1976 for a removable fluid holding tank for vehicle. However, it differs from the present invention because Watson teaches a removable waste fluid holding tank for use with a vehicle. A pair of U-shaped support straps is suspended below the body of the vehicle with the base portion of the strap farthest inwardly from the side of the vehicle lower than the other strap. The tank is constructed to rest on the straps under the body of the vehicle and has an indentation in its base for receiving a portion of one of the straps to inhibit horizontal removal of the tank from the straps. The tank has inlet and vent connections at one end thereof to which drain and vent conduits may connect the tank to plumbing in the vehicle. Within the tank, a conduit connects the inlet opening with the base of the tank. A handle is provided for lifting the tank slightly to release it from the strap, allowing it to be pulled horizontally therefrom after such release.

Applicant believes that another reference corresponds to U.S. Pat. No. 3,570,016 B1 issued to Ellis, et al. on Mar. 16, 1971 for a portable chemical toilet system. However, it differs from the present invention because Ellis, et al. teaches a portable toilet system mounted on a railroad car including a toilet housing compartment positioned within the railroad car and having a receiving tank positioned therein adapted to contain a liquid chemical solution for decomposing purposes and a toilet seat having an opening there-through mounted in the compartment. The receiving tank has a passageway communicating with the toilet seat opening and is adapted and arranged to receive excrement from the toilet seat opening. The system also includes an enclosed holding tank positioned below the receiving tank and exteriorly of the railroad car there-beneath, which is adapted and arranged to receive and hold periodic discharges of the contents of the receiving tank after excreta has built up therein, and passage means communicating between the tanks with selectively operable valve means positioned in the passage means for transferring the contents of the receiving tank into the holding tank. The handle of the valve means is inaccessible to the user of the toilet within the compartment and is operable from a position exteriorly of the railroad car.

Applicant believes that another reference corresponds to U.S. Patent Application Publication No. 20080035654 A1, published on Feb. 14, 2008 to Hall, et al. for a portable waste transfer tank. However, it differs from the present invention because Hall, et al. teaches a main body portion defining a waste holding chamber, a vent path extending from the waste holding chamber to atmosphere, and a float member. The float member is coupled to the tank for movement between a first position and a second position. The float member is movable from the first position to the second position in response to an increase in fluid level within the storage chamber. The vent passage remains open for venting the storage chamber when the float member is in the first position and is blocks the vent passage in the second position.

Other patents describing the closest subject matter provide for a number of more or less complicated features that fail to solve the problem in an efficient and economical way. None of these patents suggest the novel features of the present invention.

SUMMARY OF THE INVENTION

The present invention is a telescopic bracket assembly for vehicle waste tanks, comprising at least first and second longitudinal frame members, at least one transversal member, stationary configuration means, at least one aft transversal member, and at least one longitudinal telescopic assembly. The stationary configuration means comprise a wheel chock assembly comprising at least first and second wheel chocks that are fixed to the at least first and second longitudinal frame members respectively. In an alternate embodiment, the stationary configuration means comprise indentations at the longitudinal frame members respectively. The present invention further comprises at least one transversal telescopic assembly. The at least first and second wheel chocks are at a predetermined distance from the at least one aft transversal member.

The at least first and second longitudinal frame members are approximately parallel to each other and approximately perpendicular to the at least one transversal member and the at least one aft transversal member. The at least first and second longitudinal frame members, the at least one transversal member, and the at least one aft transversal member are all on a same plane. The at least first and second longitudinal frame members have respective proximal ends.

The at least one longitudinal telescopic assembly comprises first and second housings fixed at the respective proximal ends. The first and second housings receive respective telescopic bars. The respective telescopic bars have hinge assemblies that mount onto a vehicle. The at least first and second longitudinal frame members have respective lateral edges. The at least first and second longitudinal frame members have respective sidewalls extending from the respective lateral edges. The respective sidewalls are perpendicular to the at least first and second longitudinal frame members to form general "L" shapes.

The at least one transversal telescopic assembly comprises at least first and second telescopic members. The first of the at least first and second telescopic members slidably receives the at least one transversal member, and the second of the at least first and second telescopic members slidably receives the at least one aft transversal member.

The present invention further comprises a portable waste tank having wheels that are aligned with the at least first and second longitudinal frame members. A force is placed upon the portable waste tank to cause it to travel upon the at least first and second longitudinal frame members and overcome the wheel chock assembly. Once the portable waste tank is inserted onto longitudinal frame members, the wheel chock assembly keeps the portable waste tank secure. The respective sidewalls serve as guides to prevent the portable waste tank from derailing.

It is therefore one of the main objects of the present invention to provide a telescopic bracket assembly for vehicle waste tanks having a cooperative shape and dimensions to adjustably receive a portable waste tank thereon.

It is another object of this invention to provide a telescopic bracket assembly for vehicle waste tanks that can be used with recreational vehicles and food trailers, better known as food trucks.

It is another object of this invention to provide a telescopic bracket assembly for vehicle waste tanks that keeps a waste tank conveniently stored underneath a vehicle, without obstructing any functionalities of the vehicle.

It is another object of this invention to provide a telescopic bracket assembly for vehicle waste tanks that is adjustable according to the width of a respective waste tank.

It is another object of this invention to provide a telescopic bracket assembly for vehicle waste tanks that comprises a longitudinal telescopic assembly.

It is another object of this invention to provide a telescopic bracket assembly for vehicle waste tanks that comprises a wheel chock assembly to secure the waste tank in place while the invention is in a deployed configuration.

It is another object of this invention to provide a telescopic bracket assembly for vehicle waste tanks that is volumetrically efficient in operation, and for transporting and storage.

It is another object of this invention to provide a telescopic bracket assembly for vehicle waste tanks made of a durable and reliable construction.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Referring now to the drawings, the present invention is a telescopic bracket assembly for vehicle waste tanks and is generally referred to with numeral 10. It can be observed that it basically includes longitudinal frame members 20 and 40, transversal member 60, wheel chock assembly 70, aft transversal member 80, transversal telescopic assembly 100, and longitudinal telescopic assembly 120.

Figure 1:
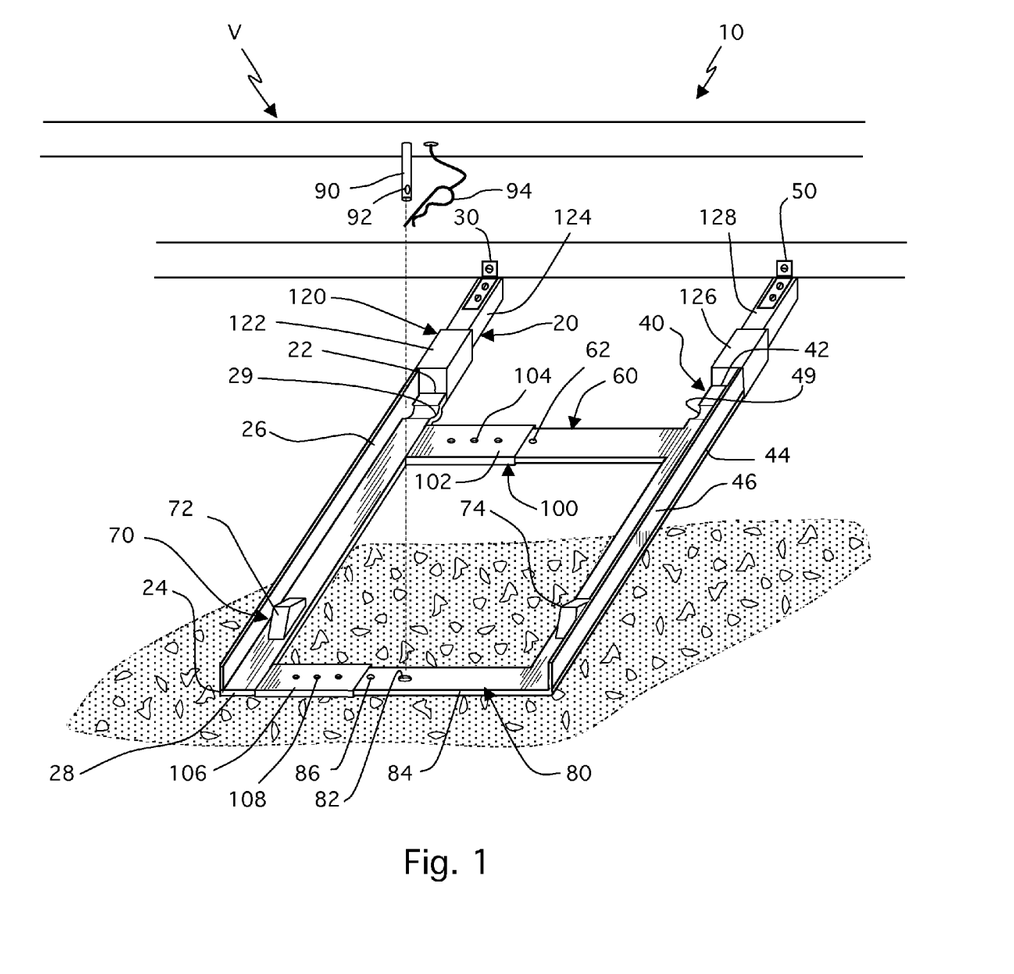
FIG. 1 is a first isometric view of the present invention in a deployed configuration, mounted underneath a vehicle.
Figure 2:
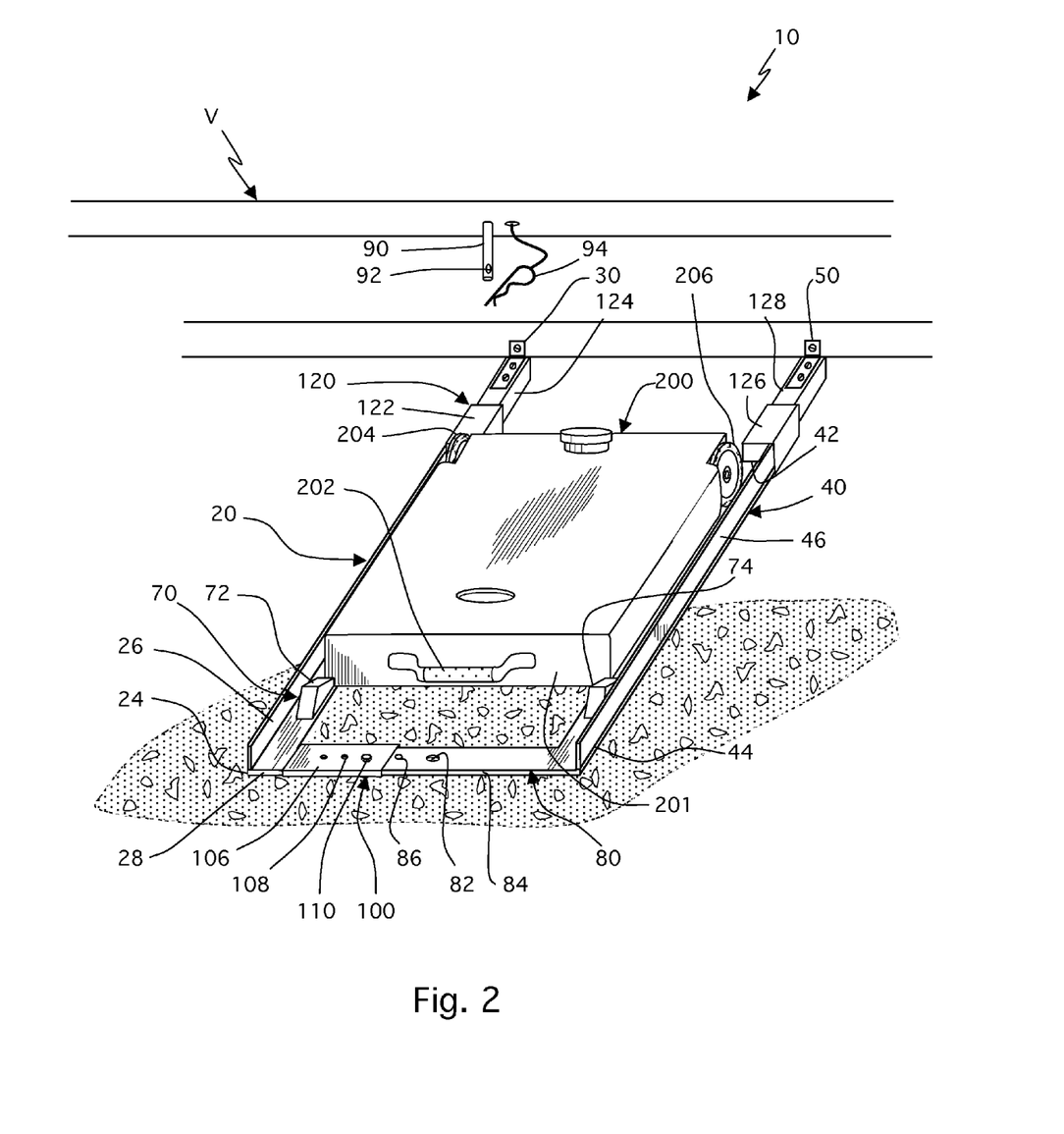
FIG. 2 is a second isometric view of the present invention in the deployed configuration, mounted underneath the vehicle and having received a vehicle waste tank thereon.

As seen in FIGS. 1 and 2, longitudinal frame members 20 and 40 have respective proximal ends 22 and 42. Longitudinal frame members 20 and 40 also have respective lateral edges 24 and 44. In addition, longitudinal frame members 20 and 40 have respective sidewalls 26 and 46 extending from lateral edges 24 and 44. Sidewalls 26 and 46 are perpendicular to longitudinal frame members 20 and 40 to form general "L" shapes. Sidewall 26 extends from its proximal end 22 to edge 28, and sidewall 46 extends from its proximal end 42 to aft edge 84.

Transversal member 60 extends from longitudinal frame member 40 at a predetermined distance from aft transversal member 80. Transversal member 60 comprises at least one hole 62. Aft transversal member 80 also extends from longitudinal frame member 40, and comprises locking hole 82 and at least one hole 86.

Transversal telescopic assembly 100 comprises telescopic members 102 and 106. Telescopic member 102 extends from longitudinal frame member 20 and comprises at least one hole 104. Telescopic member 102 slidably receives transversal member 60. Telescopic member 106 also extends from longitudinal frame member 20 and comprises at least one hole 108. Telescopic member 106 slidably receives aft transversal member 80.

Locking members 110, seen in FIG. 2, lock the position of telescopic members 102 and 106 once present invention 10 has been adjusted to a desired width, whereby at least one hole 86 aligns with respective at least one hole 108, as do at least one hole 62 and respective at least one hole 104. It is noted that the width of present invention 10 needs to be adjusted according to the width of the specific portable waste tank 200 to be stowed and before mounting portable waste tank 200 to present invention 10.

In a preferred embodiment, longitudinal frame members 20 and 40 are approximately parallel to each other, and approximately perpendicular to transversal member 60 and aft transversal member 80. In a preferred embodiment, longitudinal frame members 20 and 40, transversal member 60, and aft transversal member 80 are all on a same plane.

Wheel chock assembly 70 comprises wheel chocks 72 and 74 that are fixed to longitudinal frame members 20 and 40 respectively at a predetermined distance from aft edge 84. It is noted that wheel chock assembly 70 serves as stationary configuration means to keep portable waste tank 200 in a stationary configuration, whereby wheels 204 and 206 remain stationary, blocked by wheel chocks 72 and 74. Alternate means to keep portable waste tank 200 in the stationary configuration may instead comprise indentations 29 and 49 at longitudinal frame members 20 and 40 respectively at a predetermined distance from aft edge 84, whereby wheels 204 and 206 remain stationary within the indentations 29 and 49.

Longitudinal telescopic assembly 120 comprises housings 122 and 126. Housings 122 and 126 are fixed at proximal ends 22 and 42 respectively. Housing 122 telescopically receives telescopic bar 124, and housing 126 telescopically receives telescopic bar 128. The distal ends of telescopic bars 124 and 128 have respective hinge assemblies 30 and 50 that mount onto vehicle V, best seen in FIG. 4.

Locking pin 90 is fixed to vehicle V. Locking pin 90 comprises hole 92 and security pin 94. Security pin 94 may also be secured to vehicle V, next to locking pin 90. Security pin 94 is secured to vehicle V by any flexible attaching means. The flexible attaching means may be a cable, rope, or cord of a cooperative length to permit security pin 94 to fill hole 92, while not interfering with any other components of vehicle V.

As best seen in FIG. 2, portable waste tank 200 comprises wall 201, handle 202 and wheels 204 and 206. Longitudinal frame members 20 and 40 extend downwardly at a predetermined angle when in a deployed configuration. In a preferred embodiment when in the deployed configuration, aft edge 84 contacts a surface to receive portable waste tank 200.

As seen in FIGS. 3A, 3B, 3C, and 3D portable waste tank 200 may be effectively stowed beneath vehicle V without obstructing any functionalities of vehicle V.

Figure 3A:
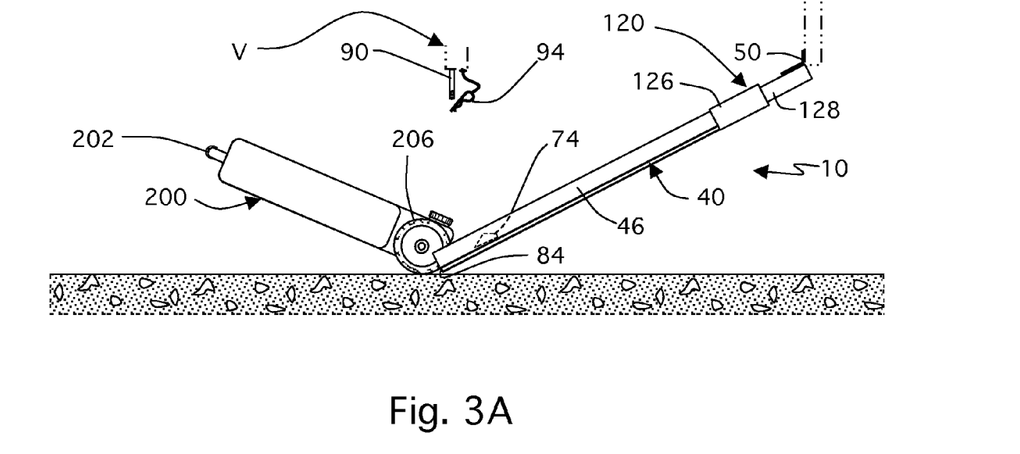
FIG. 3A is a first side view of the present invention in the deployed configuration receiving the vehicle waste tank thereon. The longitudinal telescopic assembly is shown extended.

To mount portable waste tank 200 and place it in the stowed configuration, security pin 94 is removed from locking pin 90 to place instant invention 10 in the deployed configuration, whereby aft edge 84, in a preferred embodiment, contacts a surface as seen in FIG. 3A.

Figure 3B:
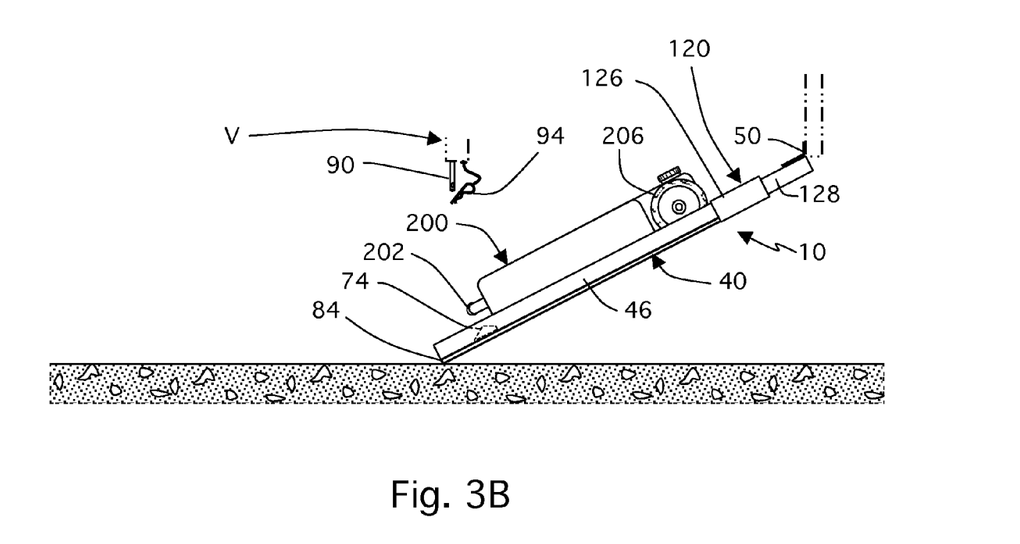
FIG. 3B is a second side view of the present invention in the deployed configuration having received the vehicle waste tank thereon. The longitudinal telescopic assembly is shown extended.

Portable waste tank 200, and specifically, wheels 204 and 206 are aligned with longitudinal frame members 20 and 40. A force is placed upon portable waste tank 200 to cause it to travel upon longitudinal frame members 20 and 40, and overcome wheel chocks 72 and 74 as seen in FIG. 3B. Once portable waste tank 200 is fully inserted onto longitudinal frame members 20 and 40, wheel chocks 72 and 74 keep portable waste tank 200 secure by blocking wall 201 as seen best in FIG. 2. Sidewalls 26 and 46 serve as guides to prevent portable waste tank 200 from derailing.

Figure 3C:
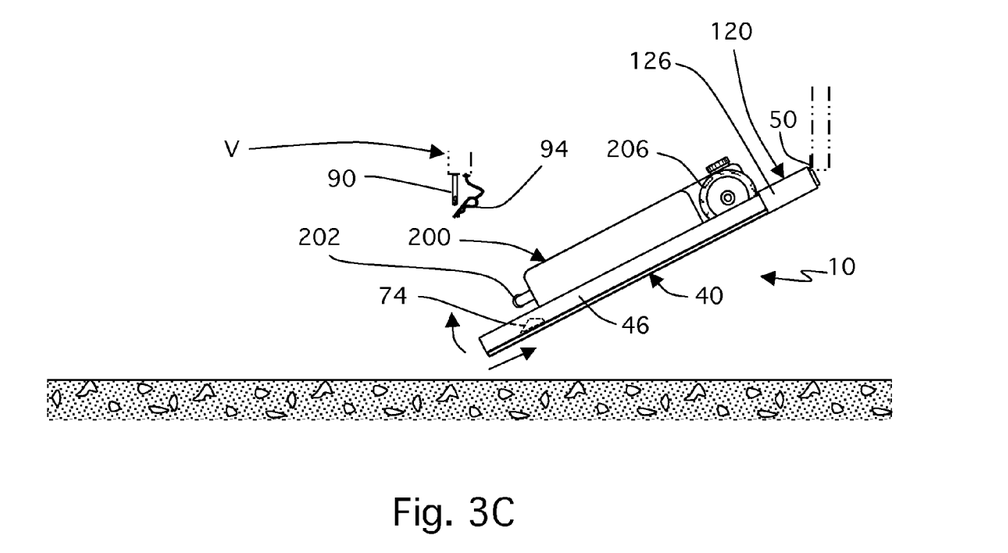
FIG. 3C is a third side view of the present invention in the deployed configuration having received the vehicle waste tank thereon. The longitudinal telescopic assembly is shown retracted.

As best seen in FIG. 3C, longitudinal telescopic assembly 120 retracts when a predetermined force is placed thereon, specifically housing 122 telescopically receives telescopic bar 124, and housing 126 telescopically receives telescopic bar 128.

Figure 3D:
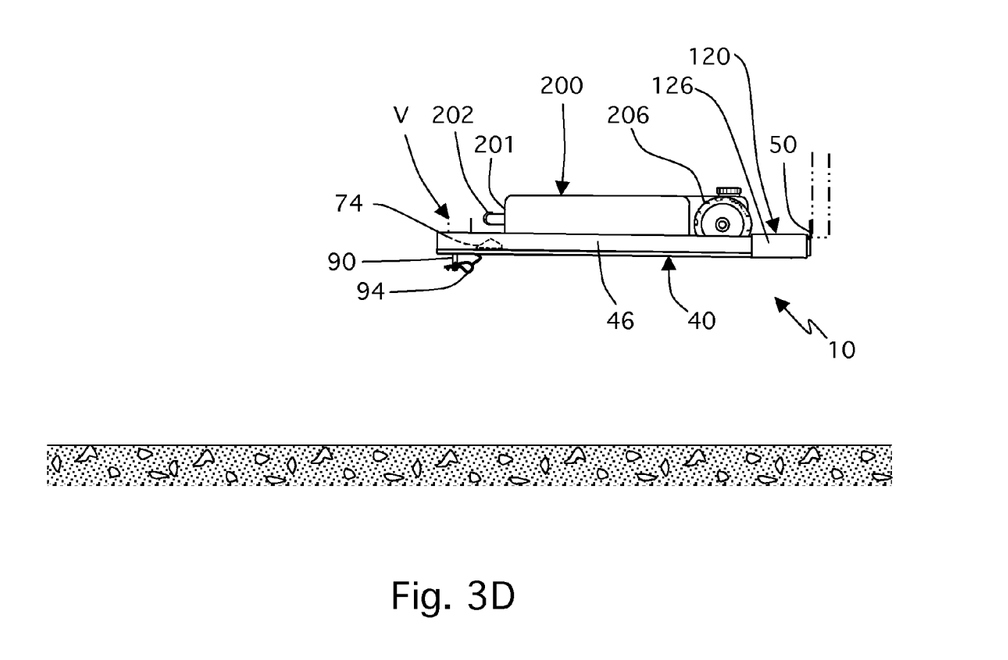
FIG. 3D is a fourth side view of the present invention in a stowed configuration having secured the vehicle waste tank thereon.

As seen in FIG. 3D, aft edge 84 is then elevated to place present invention 10 in the stowed configuration, wherein locking pin 90 travels through locking hole 82, and security pin 94 is positioned to fill hole 92, thus effectively stowing portable waste tank 200 underneath vehicle V. In the stowed configuration, present invention 10, in a preferred embodiment, is approximately on a horizontal plane. However, present invention 10 may effectively be stowed even if not on a horizontal plane.

Figure 4:
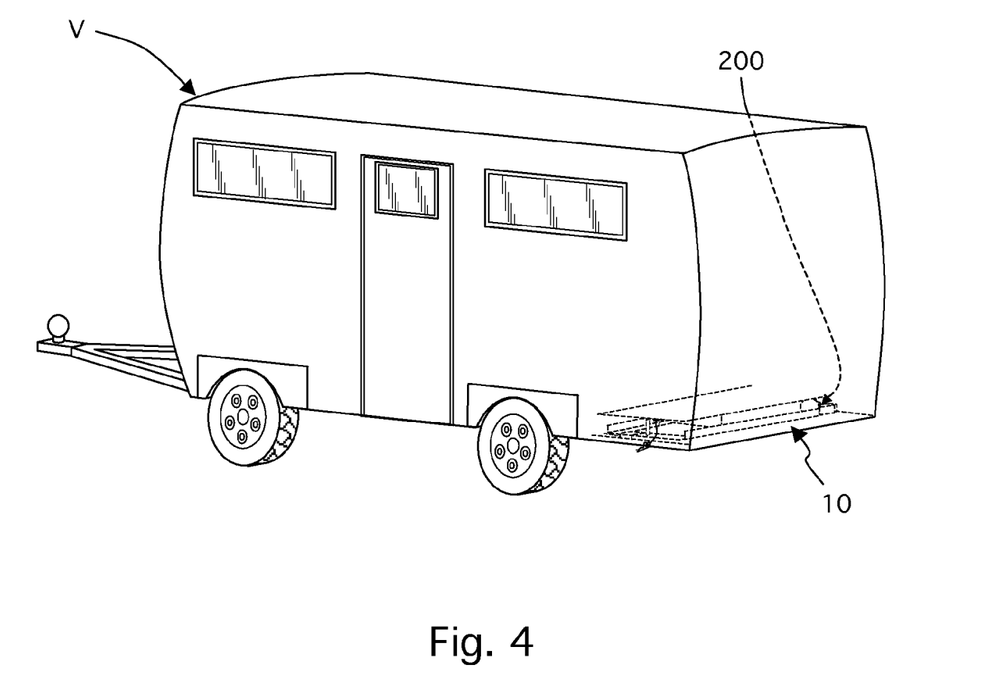
FIG. 4 is an isometric view of a recreational vehicle with the present invention in the stowed configuration having secured the vehicle waste tank thereon.

As seen in FIG. 4, instant invention 10 is mounted onto the underside of vehicle V, so that it is not seen and does not obstruct any functionalities of vehicle V while stowing portable waste tank 200. In the preferred embodiment, vehicle V is a recreational vehicle, including but not limited to a vehicle that may have a kitchen, a bathroom, a bedroom and a living room. The vehicle may also be defined as a caravan, camper, or camper van. The vehicle is intended for everything from brief leisure activities such as vacations and camping, to full-time living, for which they are often parked in special trailer parks. It is noted that bracket assembly for vehicle waste tanks 10 can be also used with food trailers (not shown), better known as food trucks, because they use the same waste tanks.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A telescopic bracket assembly for vehicle waste tanks, comprising:
    A) at least first and second longitudinal frame members having respective proximal ends, respective lateral edges, and respective sidewalls extending from said respective lateral edges;
    B) at least one transversal member;
    C) stationary configuration means;
    D) at least one aft transversal member; and
    E) at least one longitudinal telescopic assembly having first and second housings fixed at said respective proximal ends, said first and second housings receive respective telescopic bars, said respective telescopic bars have hinge assemblies that mount onto a vehicle; and
    F) a portable waste tank for being supported on the frame members.

2. The telescopic bracket assembly for vehicle waste tanks set forth in claim 1, further characterized in that said stationary configuration means comprises a stop member assembly comprising at least first and second stop members that are fixed to said at least first and second longitudinal frame members respectively.

3. The telescopic bracket assembly for vehicle waste tanks set forth in claim 1, further characterized in that said stationary configuration means comprises indentations at said at least first and second longitudinal frame members respectively.

4. The telescopic bracket assembly for vehicle waste tanks set forth in claim 1, further comprising at least one transversal telescopic assembly.

5. The telescopic bracket assembly for vehicle waste tanks set forth in claim 2, further characterized in that said at least first and second stop members are at a predetermined distance from said at least one aft transversal member.

6. The telescopic bracket assembly for vehicle waste tanks set forth in claim 1, further characterized in that said at least first and second longitudinal frame members are approximately parallel to each other and approximately perpendicular to said at least one transversal member and said at least one aft transversal member.

7. The telescopic bracket assembly for vehicle waste tanks set forth in claim 1, further characterized in that said at least first and second longitudinal frame members, said at least one transversal member, and said at least one aft transversal member are all on a same plane.

8. The telescopic bracket assembly for vehicle waste tanks set forth in claim 1, further characterized in that said respective sidewalls are perpendicular to said at least first and second longitudinal frame members to form general "L" shapes.

9. The telescopic bracket assembly for vehicle waste tanks set forth in claim 4, further characterized in that said at least one transversal telescopic assembly comprises at least first and second telescopic members.

10. The telescopic bracket assembly for vehicle waste tanks set forth in claim 9, further characterized in that said first of said at least first and second telescopic members slidably receives said at least one transversal member.

11. The telescopic bracket assembly for vehicle waste tanks set forth in claim 9, further characterized in that said second of said at least first and second telescopic members slidably receives said at least one aft transversal member.

12. The telescopic bracket assembly for vehicle waste tanks set forth in claim 1, further characterized in that said portable waste tank has wheels that are aligned with said at least first and second longitudinal frame members.

13. The telescopic bracket assembly for vehicle waste tanks set forth in claim 12, further characterized in that said respective sidewalls serve as guides to prevent said portable waste tank from derailing.

\* \* \* \* \*